(12) United States Patent
Ranalli

(10) Patent No.: US 7,628,008 B2
(45) Date of Patent: Dec. 8, 2009

(54) EXHAUST SYSTEM OF A MOTOR VEHICLE WITH A DIESEL ENGINE

(75) Inventor: Marco Ranalli, Augsburg (DE)

(73) Assignee: Emcon Technologies LLC, Wilmington, DE (US)

( * ) Notice: Subject to any disclaimer, the term of this patent is extended or adjusted under 35 U.S.C. 154(b) by 0 days.

(21) Appl. No.: 11/663,009

(22) PCT Filed: Sep. 13, 2005

(86) PCT No.: PCT/EP2005/009821

§ 371 (c)(1),
(2), (4) Date: Sep. 27, 2007

(87) PCT Pub. No.: WO2006/029808

PCT Pub. Date: Mar. 23, 2006

(65) Prior Publication Data

US 2008/0034739 A1 Feb. 14, 2008

(30) Foreign Application Priority Data

Sep. 17, 2004 (DE) ........................ 10 2004 045 178
Jan. 26, 2005 (DE) .................... 20 2005 001 257 U

(51) Int. Cl.
*F02M 25/06* (2006.01)
(52) U.S. Cl. ............................. 60/278; 60/286; 60/295; 60/297; 60/301; 60/303; 60/311
(58) Field of Classification Search .................. 60/278, 60/280, 286, 295, 297, 311, 301, 303
See application file for complete search history.

(56) References Cited

U.S. PATENT DOCUMENTS

| | | | |
|---|---|---|---|
| 4,662,172 A * | 5/1987 | Shinzawa et al. | 60/303 |
| 4,887,427 A | 12/1989 | Shinzawa et al. | |
| 5,617,726 A * | 4/1997 | Sheridan et al. | 60/605.2 |
| 6,301,888 B1 * | 10/2001 | Gray, Jr. | 60/605.2 |
| 6,651,432 B1 * | 11/2003 | Gray, Jr. | 60/605.2 |
| 6,708,104 B2 * | 3/2004 | Avery et al. | 701/110 |
| 6,742,335 B2 * | 6/2004 | Beck et al. | 60/605.2 |
| 6,829,889 B2 * | 12/2004 | Saito et al. | 60/291 |
| 6,865,882 B2 | 3/2005 | Minami | |
| 6,981,370 B2 * | 1/2006 | Opris et al. | 60/311 |
| 7,127,892 B2 * | 10/2006 | Akins et al. | 60/600 |
| 2003/0213231 A1 * | 11/2003 | Tabata | 60/280 |
| 2006/0021335 A1 * | 2/2006 | Opris | 60/297 |

FOREIGN PATENT DOCUMENTS

| | | |
|---|---|---|
| JP | 59150918 | 8/1984 |
| JP | 59201916 | 11/1984 |
| JP | 2001295627 | 10/2001 |
| JP | 2001355431 | 12/2001 |

\* cited by examiner

*Primary Examiner*—Thomas E Denion
*Assistant Examiner*—Diem Tran
(74) *Attorney, Agent, or Firm*—Carlson, Gaskey & Olds

(57) ABSTRACT

An exhaust system for a motor vehicle with a diesel engine (10) includes a particulate filter unit (36), a particulate receiving accumulator (24) close to the engine being arranged upstream of the particulate filter unit (36) and binding a partial quantity of the particulates contained in the exhaust gas flow, with another partial quantity of the particulates contained in the exhaust gas flow flowing through the particulate receiving accumulator (24) to the particulate filter unit (36). The particulate receiving accumulator (24) is arranged so close to the engine (10) that it is at least partly regenerated during operation owing to the $NO_2$ oxidation effect.

27 Claims, 2 Drawing Sheets

EXHAUST SYSTEM OF A MOTOR VEHICLE WITH A DIESEL ENGINE

CROSS REFERENCE TO RELATED APPLICATIONS

This application is a U.S. national counterpart application of international application serial No. PCT/EP2005/009821 filed Sep. 13, 2005, which claims priority to German Patent Application No. 10 2004 045 178.8 filed Sep. 17, 2004 and German Patent Application No. 20 2005 001 257.2 filed Jan. 26,2005. The entireties of these applications is hereby incorporated by reference.

TECHNICAL FIELD

The invention relates to an exhaust system of a motor vehicle with a diesel engine, the exhaust system including a particulate filter unit.

BACKGROUND

Particulate filters of this type, more simply also referred to as soot filters, are intended to reduce the exhaust gas particulate emissions. The core piece of the particulate filter units is a substrate, in particular of SiC, which is accommodated in a separate outer housing, the exhaust pipe opening into the housing downstream and upstream of the particulate filter unit. The particulate filter insert itself, i.e. the substrate, needs to be regenerated from time to time by combustion of the particulates accumulated on the filter surface. One of the most promising possibilities of regeneration consists in introducing fuel into the exhaust gas immediately upstream of the particulate filter unit; if possible, the fuel should be in vapor form in order not to overly cool down the exhaust gas, among other reasons. This is described in EP 1 369 557 A1, for example.

Furthermore, attempts are being made to make the particulate filter units more cost-effective. The high costs of the particulate filter units are due, for one thing, to the very expensive SiC material of the substrate and to the complicated support of the substrate by means of support mats in the outer housing of the diesel particulate filter unit. As far as the incorporation into the housing is concerned, the expenditure resides, among other things, in that, because of the $NO_2$ oxidation effect, the particulate filter units should be mounted as close to the engine as possible or are provided with heating means. The $NO_2$ oxidation effect consists in that carbon oxidizes with the $NO_2$ in the exhaust gas at temperatures above 230 degrees Celsius, producing nitrogen and $CO_2$. But this regeneration effect, which is less effective in comparison with the combustion with oxygen, is to be made use of in the particulate filter unit. On the other hand, when the particulate filter unit is arranged close to the engine, extremely high requirements are to be satisfied with respect to the support of the substrate and durability of the substrate and the housing because of the strong vibrations in the section of the exhaust system close to the engine. In addition, little space is available in the exhaust system near the engine for the voluminous particulate filter units. The consequence is a number of factors which are partly contradictory and, when one first looks at it, appear to be mutually exclusive as regards the design and arrangement of the particulate filter unit with a view to a more cost-effective configuration.

Concepts of accommodating a main filter and a pre-filter in the particulate filter unit itself, i.e. in the same outer housing, have been disclosed in U.S. Pat. No. 5,053,062 and EP 1 205 228 A1 and also in EP 0 957 241 A1. But these concepts do not provide for a truly marked reduction in the costs of a particulate filter unit or for a distinctly simplified accommodation of the exhaust system in the vehicle.

SUMMARY

The invention provides these advantages aimed at in an exhaust system of the type mentioned at the outset in that a particulate receiving accumulator close to the engine is arranged upstream of the particulate filter unit and binds a partial quantity of the particulates contained in the exhaust gas flow, with another partial quantity of the particulates contained in the exhaust gas flow flowing through the particulate receiving accumulator to the particulate filter unit, the particulate receiving accumulator being arranged so close to the engine that it is regenerated during operation owing to the $NO_2$ oxidation effect.

In contrast to the prior art mentioned above, which uses a pre-filter arranged in the particulate filter unit close to the substrate, the invention makes provision for a particulate receiving accumulator, structurally separated and arranged outside of the particulate filter unit, which binds part of the particulates and discharges them in a "converted" form by making use of the $NO_2$ oxidation effect. The filter insert of the particulate filter unit (substrate) and the insert in the particulate receiving accumulator are spaced apart from each other on the order of at least 300 mm. The particulate receiving accumulator continuously takes up a partial quantity of the incoming particulates to emit part of them again in the form of $CO_2$. This partial quantity of particulates no longer needs to be taken up by the particulate filter unit, so that the latter fills with particulates at a distinctly slower rate and thus must be regenerated considerably less often. This allows to arrange the particulate filter unit distinctly farther away from the engine than is actually aimed at. As the distance from the engine increases, vibrations in the exhaust system decrease, so that, on the one hand, the particulate filter unit may be equipped with a more favorably priced substrate and, on the other hand, the expenditure required for incorporation in the housing is reduced. The structural separation of the particulate receiving accumulator from the particulate filter unit makes it possible to accommodate these components in totally different places in the vehicle, which is highly desirable in view of the small amount of space available at any rate. Since some combustion of a certain amount of soot takes place in the particulate receiving accumulator as well, though not actively initiated by a separate device, in the exhaust system according to the invention an increase in the exhaust gas temperature downstream of the particulate receiving accumulator will occur, brought about by the combustion.

Preferably, the particulate receiving accumulator always allows a certain partial quantity of exhaust gas, along with particulates, to pass through it irrespective of its filling degree, i.e. the amount of particulates contained in it, which will not be captured until in the particulate filter unit. This means that the particulate receiving accumulator can not clog. In this respect, the particulate receiving accumulator differs from a conventional pre-filter in the prior art, which is intended to capture larger particulates in the pre-filter and where only smaller particulates will reach the main filter. The particulate receiving accumulator is intended to accumulate as large and as small particulates as possible and to allow large particulates to pass even in the event of a high filling degree. Another result of this effect is that in the exhaust system according to the invention it is not possible for a high back pressure to develop due to a filter that is close to the engine and almost completely filled with soot.

According to the preferred embodiment, the particulate receiving accumulator is capable of binding only a smaller quantity of particulates than the particulate filter unit. In addition, the particulate receiving accumulator is preferably adapted such that it binds the smaller partial quantity (less than 50% by weight) of the particulates flowing into it. This allows to design the particulate receiving accumulator so as to be of a relatively small size, so that it can actually be arranged very close to the engine. But as the proximity to the engine increases, its temperature rises, which in turn improves the $NO_2$ oxidation effect, so that the particulate receiving accumulator features a high efficiency in relation to the particulate receiving capacity. The smaller size and the low weight result in lower demands to be made on the mounting in the region close to the engine. In addition, the smaller size and the reduced volume requirement allow the use of materials of higher quality. On the other hand, the arrangement of the particulate filter unit remote from the engine allows the use of less expensive substrate material, in particular cordierite.

As mentioned above, the particulate receiving accumulator preferably is in fluid communication with the particulate filter unit by an exhaust pipe and is structurally separated. The exhaust pipe has, of course, a substantially smaller external cross-section than the particulate filter unit.

According to the preferred embodiment, a vibration isolating arrangement is provided in the exhaust pipe between the particulate filter unit and the particulate receiving accumulator, the vibration isolating arrangement connecting the section including the particulate filter unit and the section including the particulate receiving accumulator with each other. This vibration isolating arrangement is already known per se; preferably, it separates the manifold portion of the exhaust system from the so-called underbody section. This embodiment allows to an even greater extent to configure the particulate filter unit, which is then largely vibration-isolated from the engine, at a more reasonable price, as far as the material of the substrate and both the incorporation into the outer housing and the configuration of the outer housing itself are concerned.

The preferred embodiment makes provision that the particulate receiving accumulator is arranged in or immediately adjacent to the manifold section.

The particulate filter unit should however be positioned in the underbody portion of the exhaust gas purification device, where more space is available for this large-volume unit.

A turbocharger is preferably seated in the exhaust system. The particulate receiving accumulator should be arranged immediately upstream of the turbocharger so as to reduce the load thereof by particulates, or else should be arranged immediately downstream thereof. This arrangement makes sure in any event that the particulate receiving accumulator is arranged close to the engine.

Provision may be made, if desired, for a regeneration device disposed downstream of the particulate receiving accumulator and, if possible, immediately upstream of the particulate filter unit, for sensor-controlled discontinuous regeneration of the particulate filter unit, preferably as a function of the loading level of the substrate. This is to result in as complete a regeneration as possible of the substrate in the particulate filter unit.

The regeneration device is more particularly a fluid or fuel introduction system in which, e.g., CO or HC is introduced for exothermic catalytic oxidation and combustion of the accumulated carbon.

Preferably, a fluid vaporizer may, of course, be employed.

To raise the temperature in the particulate filter unit, it has an oxidation catalytic converter associated with it.

This oxidation catalytic converter may be either in the form of a unit connected upstream or in the form of a section of the particulate filter unit.

The particulate receiving accumulator may also have an oxidation catalytic converter associated with it, for raising the exhaust gas temperature in the particulate receiving accumulator. Of course, in this case, too, part of the accumulator material should be coated appropriately, or else a separate oxidation catalytic converter may be connected upstream of the particulate receiving accumulator.

The invention further provides for advantages in exhaust systems with exhaust gas recirculation, which is made use of to recirculate exhaust gas to the engine. In fact, the particulate receiving accumulator is preferably arranged in the exhaust system such that the recirculated exhaust gas passes the particulate receiving accumulator. This means that exhaust gas containing fewer particulates and, above all, exhaust gas that is still hot can be returned to the engine.

The particulate receiving accumulator should be arranged upstream of a cooler seated in an exhaust gas recirculation pipe, if possible even upstream of a bypass valve connected upstream of the cooler. This reduces the particulate-induced load on the cooler and the valve.

It is further of advantage if an $NO_x$ catalytic converter, such as an SCR catalyst (selective catalytic reduction) or an LNT catalyst (lean $NO_x$ trap), also called a storage catalyst, is connected downstream of the particulate receiving accumulator.

A preferred embodiment of the particulate receiving accumulator consists in using a foamed ceramic or metal insert for accumulating the particulates.

BRIEF DESCRIPTION OF THE DRAWINGS

Further features and advantages of the invention will become apparent from the description below and from the accompanying drawings, to which reference is made and in which.

DETAILED DESCRIPTION OF THE DRAWINGS

Figure 1:
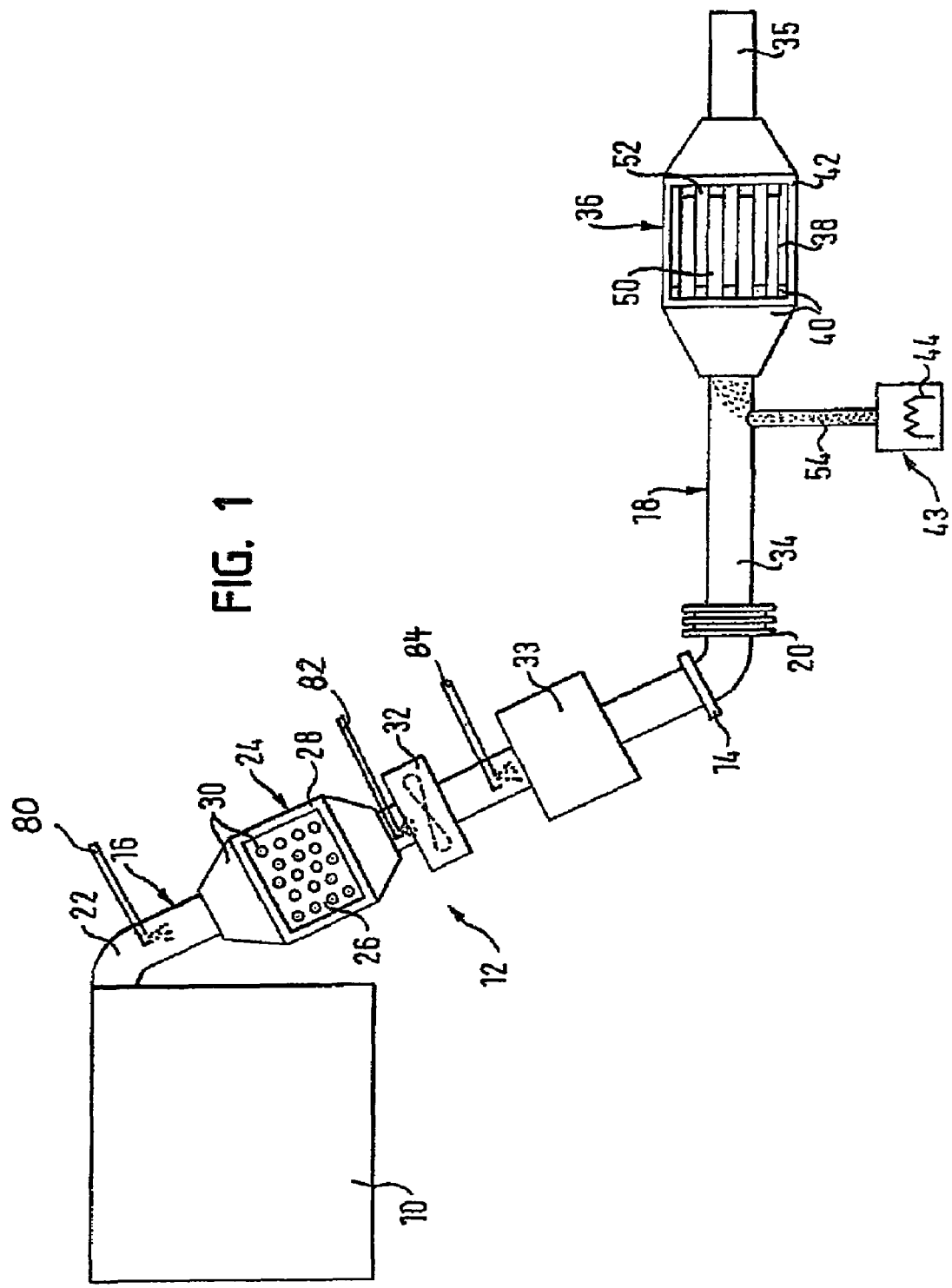
FIG. 1 shows a diagrammatic view of a motor vehicle diesel engine having an exhaust system according to the invention.

FIG. 1 shows a diesel engine 10 of a motor vehicle and an exhaust system 12 connected downstream. The exhaust system 12 has a manifold portion 16 extending as far as to a flange 14 and an adjoining underbody portion 18 downstream of the manifold portion 16, which are connected with each other by means of a vibration isolating arrangement 20.

The diesel engine 10 is adjoined by an exhaust pipe having a first pipe section 22 leading to a particulate receiving accumulator 24 which is arranged, close to the engine, in the exhaust system 12.

The particulate receiving accumulator 24 contains an insert 26 which is made of a foamed ceramic or metal and is disposed in an outer housing 28 of the particulate receiving accumulator 24. An oxidation catalytic converter 30 is seated upstream of the insert 26. Generally, however, the oxidation catalytic converter 30 is dispensed with because the upstream part of the insert 26 is appropriately coated. This means that the oxidation catalytic converter 30 is normally integrated in the insert 26.

A turbocharger 32 is seated in the manifold portion 16 immediately downstream of the particulate receiving accumulator 24. As an alternative, the positions of the particulate receiving accumulator 24 and the turbocharger 32 could also be exchanged. Likewise disposed in the manifold portion 16, more specifically downstream of the particulate receiving accumulator 24 and the turbocharger 32, is an $NO_x$ catalytic converter 33. Since the $NO_x$ catalytic converter 33 is positioned downstream in relation to the particulate receiving accumulator 24, the former is loaded with nitrogen oxides less heavily because the particulate receiving accumulator 24 already reduces a certain quantity of $NO_x$. The $NO_x$ catalytic converter 33 is, e.g., an SCR (selective catalytic reduction) catalyst or an LNT (lean $NO_x$ trap) catalyst, also referred to as storage catalyst. In SCR catalysts, the reducing agent used is urea in an aqueous solution or, in case of a solid, in particular ammonium carbamate. In LNT catalysts, $NO_x$ is accumulated temporarily. The reducing agent for regenerating the accumulator is provided as generated by the engine during short, rich operating phases. Between the regeneration phases, the nitrogen oxides are accumulated on the catalytic converter in the form of nitrates. Alternatively, the turbocharger 32 may, of course, also be dispensed with or may be arranged downstream of the $NO_x$ catalytic converter 33.

FIG. 1 shows three possible arrangements of urea injection nozzles 80, 82, 84. The injection nozzle may be located upstream of the particulate receiving accumulator 24 (nozzle 80), immediately upstream of the turbocharger 32 (nozzle 82), or immediately upstream of the $NO_x$ catalytic converter 33 (nozzle 84), the $NO_x$ catalytic converter 33 being in the form of an SCR catalyst. The arrangements upstream of the accumulator 24 or of the turbocharger 32 have the advantage that the accumulator 24 or the turbocharger 32 bring about a more uniform distribution of the urea.

The vibration isolating arrangement 20 is made of a material having such a flexibility that the engine vibrations introduced into the manifold portion 16 are preferably not transferred to the underbody portion 18 or are transferred to this portion only after being at least greatly damped. The underbody portion 18 comprises an elongated exhaust pipe 34 which leads to a particulate filter unit 36. The particulate filter unit 36 is a commonly used diesel particulate filter or soot filter having a substrate or filter insert 38 of cordierite and an oxidation catalytic converter 40 connected upstream. In this case, too, the oxidation catalytic converter 40 may be dispensed with if the upstream part of the filter insert 38 is appropriately coated. The particulate filter unit 36 is closed off to the outside by a separate outer housing 42 which has distinctly larger cross-sectional dimensions than the exhaust pipe 34 and the adjoining pipe piece 36 of the exhaust pipe. In this way, the outer housings 28, 42 are arranged at a great distance from each other and separated from each other by at least one simple exhaust pipe 34.

Located immediately upstream of the oxidation catalytic converter 40 is a regeneration device 43 for the particulate filter unit 36, having a vaporizer 44 for diesel fuel that is introduced. As an alternative, the regeneration device 43 could also be integrated in the particulate filter unit 36.

Of course, still further filter units may be built into the exhaust system 12, which are, however, not directly relevant to the expositions below, for which reasons they have been omitted for the sake of simplicity.

The exhaust gas flows through the pipe 22 into the oxidation catalytic converter 30 and then into the insert 26. The latter is formed such that it takes up and accumulates a partial quantity of the particulates contained in the exhaust gas, in particular soot particulates. Irrespective of its particulate filling degree, the insert 26 always allows exhaust gas to flow through it, including particulates that are not bound by the insert 26. This means that the particulate receiving capacity of the insert 26 is limited. But for the insert 26 to allow particulates to pass through it at all events, it includes ducts that have a larger diameter than the largest soot particulates contained in the exhaust gas. The irregular inner walls of the insert may be visualized, e.g., as walls having open, projecting gills directed upstream, where particulates can attach independently of their size.

As a result of the proximity of the particulate receiving accumulator 24 to the engine 10, the exhaust gas and, hence, the particulate receiving accumulator 24 have a high temperature during operation. This high temperature, which is above 250 degrees Celsius, promotes the $NO_2$ oxidation effect produced in the insert 26. This effect causes the particulate receiving accumulator 24 to be continuously regenerated during operation.

The oxidation catalytic converter 30 that is provided for raises the temperature in the exhaust gas still further and, hence, the temperature of the insert 26. The insert 26 permanently takes up less than 50% of the incoming particulates and allows the remaining particulates to pass through it. The exhaust gas reaches the turbocharger 32.

The exhaust gas with the rest of the particulates flows through the exhaust pipe 34 to reach the particulate filter unit 36, in the outer housing 42 of which the oxidation filter 40 may already be accommodated, if desired. Virtually all of the remaining particulates are then filtered out of the exhaust gas in the filter insert 38. These particulates are deposited in inlet ducts 50 and can not penetrate through the intermediate walls and reach the outlet ducts 52.

Since the particulate filter unit 36 is arranged in the underbody portion 18, the filter insert 38 is only heated up to a far lower temperature than the insert 26, with the result that the $NO_2$ oxidation effect occurs to a considerably lower extent or, preferably, not at all. For this reason, a systematic discontinuous regeneration of the particulate filter unit 36 is necessary. If an $NO_2$ oxidation effect took place in the filter insert 38, this would lead to excessive further carbon oxidation at those locations where carbon would first be oxidized, resulting in fluctuations in the flow and, finally, in "hot spots" which may have a detrimental effect on the filter insert.

Therefore, as soon as the filter insert 38 has exhausted its receiving capacity, vaporized fuel is introduced into the exhaust pipe 34 via the regeneration device 43 and a fuel introduction system 54. The vaporized fuel contains HC and CO, which leads to a catalytic oxidation of the fuel in the oxidation catalytic converter 40 and distinctly raises the exhaust gas temperature, which, in turn, results in the combustion of the particulates in the filter insert 38.

Figure 2:
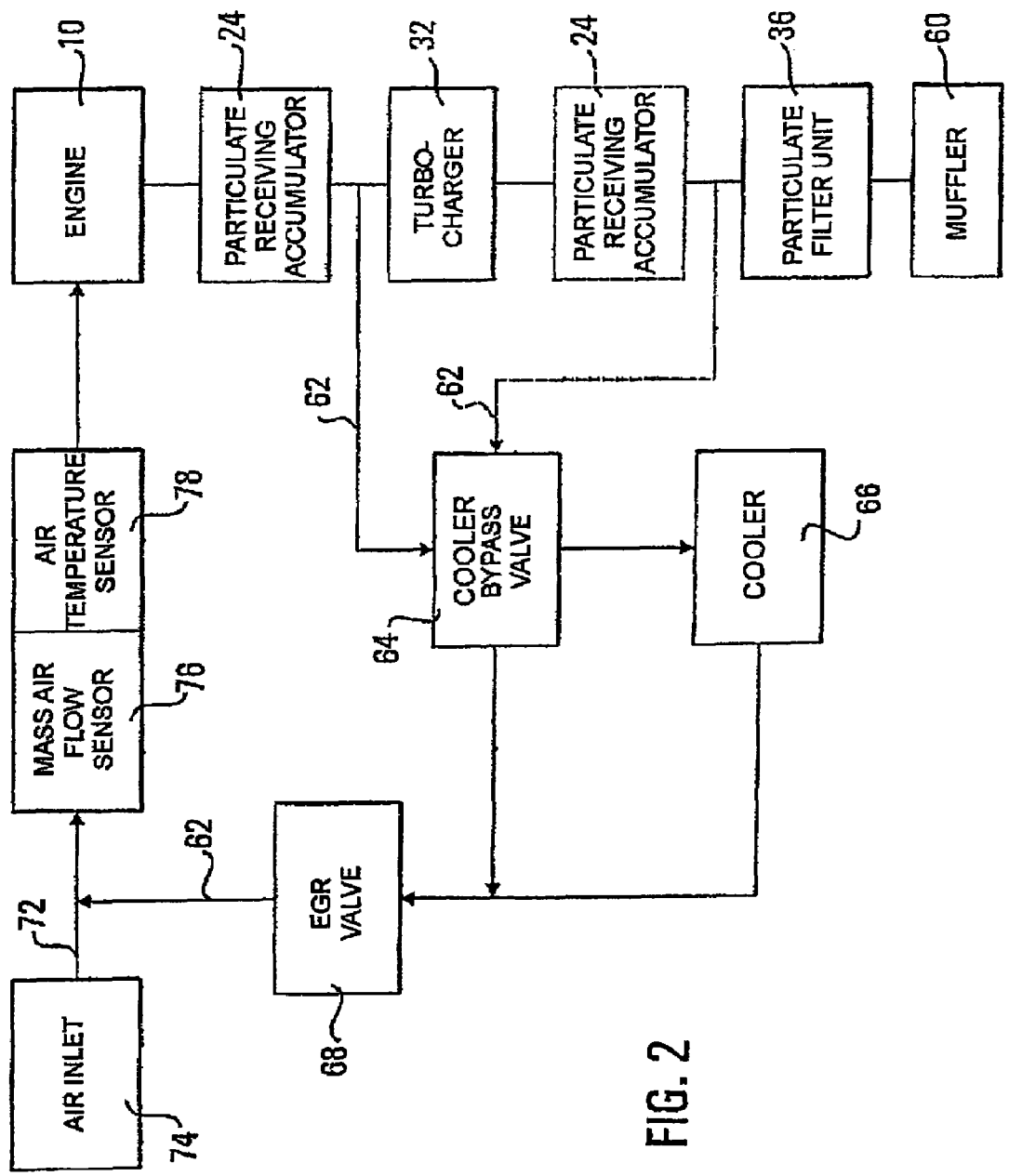
FIG. 2 shows a flow chart of a motor vehicle diesel engine having an exhaust system according to a second embodiment.

In an embodiment according to FIG. 2, provision is made for an exhaust gas recirculation. The particulate receiving accumulator 24 is located upstream or downstream of the turbocharger 32. In this case, too, the separate particulate filter unit 36, which is spatially separated from the particulate receiving accumulator 24, is provided in the underbody portion. The particulate filter unit 36, in turn, has a muffler 60 connected downstream thereof. Downstream of the particulate receiving accumulator 24, exhaust gas which already contains a reduced amount of particulates because of the particulate receiving accumulator 24, is directed by an exhaust gas recirculation pipe 62 to a cooler bypass valve 64, from where exhaust gas may flow to a so-called EGR valve 68, either directly or via a cooler 66. The exhaust gas then flows through the exhaust gas recirculation pipe 62 to reach an air supply pipe 72 between the air inlet 74 and a mass air flow sensor 76 which has an air temperature sensor 78 connected downstream thereof.

The particulate receiving accumulator 24 makes it possible to recirculate exhaust gas to the engine 10 that contains considerably less particulates than was the case previously. This reduces the risk of the particulates causing damage to devices provided in the air supply pipe 72, such as the mass air flow sensor 76 or the air temperature sensor 78. As a result of the reduced loading with particulates or soot in the exhaust gas recirculation system, the stress on the valves 64, 68 is also reduced and the performance of the cooler 66 is less detracted from. The result is an increase in the reliability and service life of the parts in the air supply pipe 72 and in the exhaust system, which reduces the overall costs.

The invention claimed is:

1. An exhaust system of a motor vehicle with a diesel engine, the exhaust system comprising:
    a particulate filter unit;
    a particulate receiving accumulator positioned close to the engine and arranged upstream of the particulate filter unit, wherein (i) the particulate receiving accumulator is operable to bind a partial quantity of the particulates contained in the exhaust gas flow, (ii) another partial quantity of the particulates contained in the exhaust gas flow flowing through the particulate receiving accumulator to the particulate filter unit, and (iii) the particulate receiving accumulator is arranged to be close to the engine so that the particulate receiving accumulator is at least partly regenerated during operation due to a $NO_2$ oxidation effect; and
    an exhaust gas recirculation arrangement that can supply exhaust gas to the engine, wherein the particulate receiving accumulator is arranged in the exhaust system such that the recirculated exhaust gas passes the particulate receiving accumulator, and wherein the particulate receiving accumulator is arranged upstream of a cooler seated in an exhaust gas recirculation pipe and with the particulate receiving accumulator being seated upstream of a bypass valve arranged in the exhaust gas recirculation pipe and connected upstream of the cooler, and wherein a portion of filtered exhaust gas flow from the particulate receiving accumulator is immediately directed into the bypass valve.

2. The exhaust system according to claim 1, wherein the particulate receiving accumulator is configured such that, irrespective of a filling degree, the particulate receiving accumulator allows a partial quantity of the particulates contained in the exhaust gas flow to reach the particulate filter unit.

3. The exhaust system according to claim 1, wherein the particulate receiving accumulator is configured to bind a smaller quantity of particulates than the particulate filter unit.

4. The exhaust system according to claim 1, wherein the particulate receiving accumulator is in fluid communication with the particulate filter unit via an exhaust pipe.

5. The exhaust system according to claim 1, further comprising a vibration isolating arrangement provided on an exhaust pipe arranged between the particulate receiving accumulator and the particulate filter.

6. The exhaust system according to claim 1, including a turbocharger, wherein the particulate receiving accumulator is arranged immediately upstream or downstream of the turbocharger.

7. The exhaust system according to claim 1, wherein the particulate filter unit has a filter insert including cordierite.

8. The exhaust system according to claim 1, further comprising an oxidation catalytic converter configured to raise the temperature in the particulate filter unit.

9. The exhaust system according to claim 1, wherein the particulate receiving accumulator includes an oxidation catalytic converter to raise the temperature of the exhaust gas in the particulate receiving accumulator.

10. The exhaust system according to claim 1, wherein the particulate receiving accumulator has a foamed ceramic or metal insert for accumulating the particulates.

11. The exhaust system according to claim 1, further comprising a $NO_x$ catalytic converter positioned downstream of the particulate receiving accumulator.

12. The exhaust system according to claim 1, wherein the particulate filter unit is arranged to be a distance from the diesel engine during operation such that there is not a continuous $NO_2$ oxidation effect due to a low operating temperature.

13. The exhaust system according to claim 1, wherein the particulate receiving accumulator is arranged in or immediately adjoining a manifold portion of the exhaust system.

14. The exhaust system according to claim 13, wherein the particulate filter unit is to be arranged in an underbody portion of the exhaust system and including at least one urea injection nozzle positioned upstream of the particulate filter unit in the manifold portion of the exhaust system.

15. The exhaust system according to claim 1, further comprising a regeneration device associated with the particulate filter unit positioned downstream of the particulate receiving accumulator, the regeneration device being operable to discontinuously regenerate the particulate filter unit.

16. The exhaust system according to claim 15, wherein the regeneration device has a fuel introduction system.

17. The exhaust system according to claim 16, wherein the regeneration device comprises a fluid vaporizer for introducing vapor into the exhaust gas.

18. The exhaust system according to claim 1, including an exhaust gas recirculation valve positioned downstream of the bypass valve such that the portion of filtered exhaust gas flow from the particulate receiving accumulator flows directly from the particulate receiving accumulator into the bypass valve and then flows either directly into the cooler or directly into the exhaust gas recirculation valve that is fluidly connected to an air supply pipe.

19. An exhaust system of a motor vehicle with a diesel engine, the exhaust system comprising:
    a particulate filter unit;
    a particulate receiving accumulator to be positioned close to an engine and arranged upstream of the particular filter unit, wherein the particulate receiving accumulator is operable to bind a partial quantity of particulates from an exhaust gas flow with another partial quantity of particulates flowing through the particulate receiving accumulator to the particulate filter unit; and
    an exhaust gas recirculation arrangement arranged downstream of the particulate receiving accumulator and upstream of the particulate filter unit, the exhaust gas recirculation arrangement including at least a recirculation valve, a cooler, and a cooler bypass valve that is positioned upstream of the recirculation valve.

20. The exhaust system according to claim 19, wherein the particulate receiving accumulator is positioned within a manifold portion of the exhaust system and is continuously regenerated during operation and wherein the particulate filter unit is positioned within an underbody portion of the exhaust system and is intermittently regenerated during operation, including at least one urea injection nozzle positioned upstream in of the particulate filter unit in the manifold portion.

21. The exhaust system according to claim 19, wherein the cooler bypass valve is positioned downstream of the particulate receiving accumulator and is upstream of the cooler.

22. The exhaust system according to claim 21 wherein the cooler bypass valve either directs exhaust gas directly to the recirculation valve or directs exhaust gas to the cooler.

23. The exhaust system according to claim 19, wherein the recirculation valve is in fluid communication with an air inlet pipe that is upstream of the engine.

24. The exhaust system according to claim 23, including a mass air flow sensor downstream of the recirculation valve.

25. The exhaust system according to claim 24, including an air temperature sensor positioned downstream of the mass air flow sensor.

26. The exhaust system according to claim 19 wherein a portion of filtered exhaust gas flow from the particulate receiving accumulator is immediately directed into the cooler bypass valve with a remaining portion of filtered exhaust gas flow being directed downstream toward the particulate filter unit.

27. The exhaust system according to claim 26 wherein the portion of filtered exhaust gas flow from the particulate receiving accumulator flows directly from the particulate receiving accumulator into the bypass valve and then flows either directly into the cooler or directly into a exhaust gas recirculation valve that is fluidly connected to an air supply pipe.

* * * * *